June 7, 1938.    R. W. GRACE    2,120,145
METER CLOSURE
Original Filed March 1, 1934
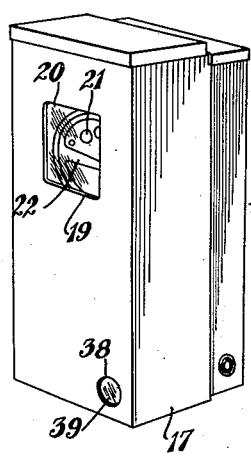
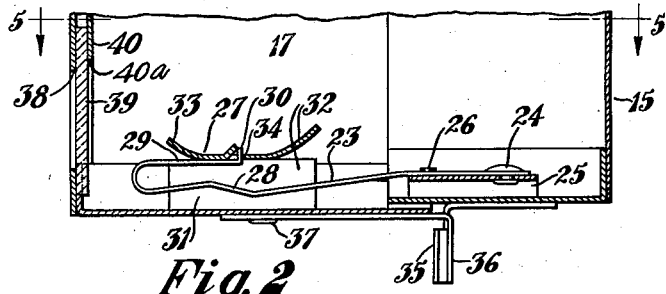
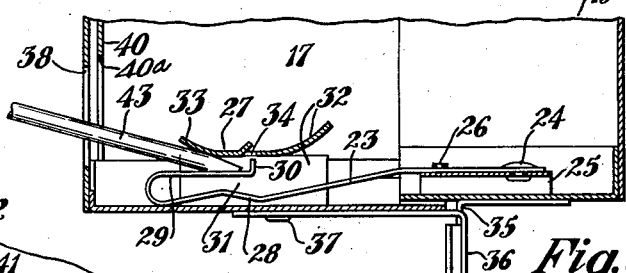
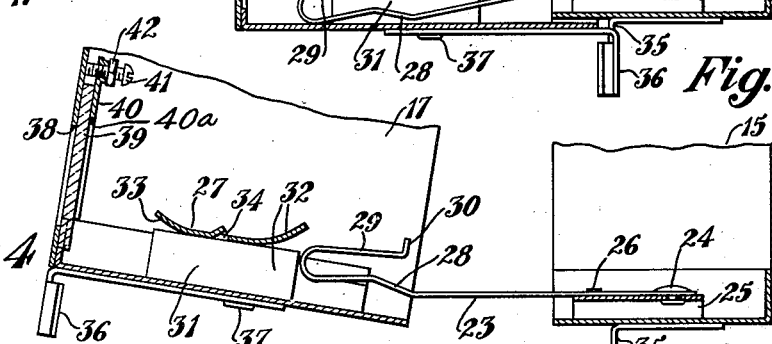
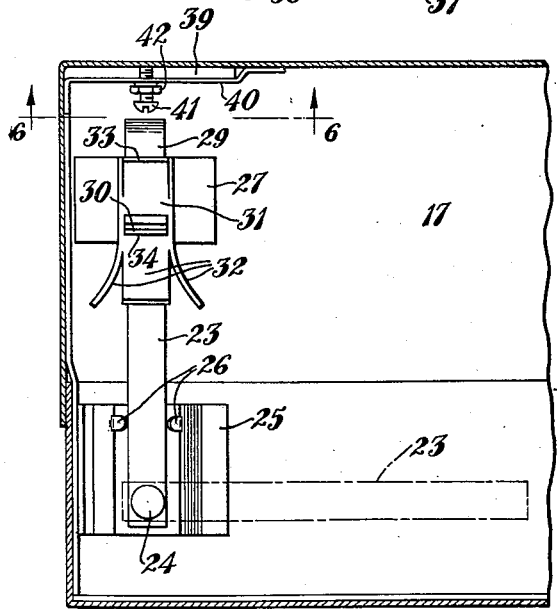
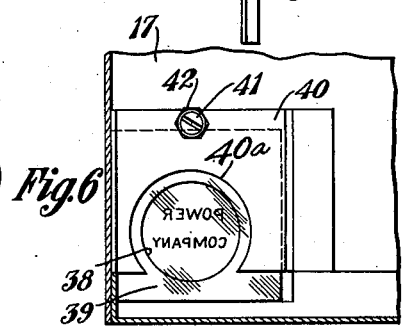
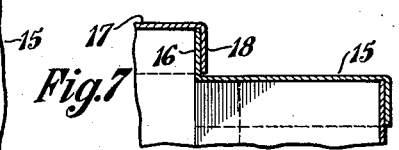
Inventor
Richard W. Grace
By Frease and Bishop
Attorneys Patented June 7, 1938

2,120,145

UNITED STATES PATENT OFFICE 2,120,145

METER CLOSURE

Richard W. Grace, Canton, Ohio, assignor to The Superior Switchboard & Devices Company, Canton, Ohio, a corporation of Ohio Original application March 1, 1934, Serial No. 713,544. Divided and this application July 17, 1937, Serial No. 154,291

6 Claims. (Cl. 40—2.2)

The invention relates to closures or containers for housing electric meters, switches, fuses and the like and more particularly to a container of this character provided with means for sealing the box so that unauthorized opening thereof, or attempts at such unauthorized opening of the box may be easily detected, and this application is a division of my copending application Serial No. 713,544, filed March 1, 1934.

The unauthorized diversion of current is a serious problem to power companies, and in order to combat the same, many companies have adopted the practice of locating their meters outside of the customers' premises and connecting them to the service lines ahead of the switches and fuses. This has required the use of metal boxes to house the meters in such outdoor locations, and it is important that these meter boxes be as nearly tamper-proof as possible in order that unauthorized attempts to open them may be easily and readily detected.

The improved meter closure to which the invention pertains has therefore been devised for such use, and briefly stated comprises a metal meter box and cover adapted to house a meter with the dials thereof visible, and provided with interlocking means in the box and cover adapted to automatically lock when the cover is closed upon the box, there being an opening in the front wall of the cover affording the only access to the locking means, and a sealing element of glass or similar transparent, readily breakable material covering said opening and so arranged that it cannot be removed from the exterior and must be broken in order to permit a tool to be inserted through said opening to unlock the locking means. In order to detect tampering, this transparent, readily breakable seal has the insignia of the power company preferably placed in reverse position upon the inner face thereof so that it is visible in properly readable position through the front face of the glass. Thus, if the insignia is placed upon the glass as by a decalcomania or the like, it will be protected against the weather but always visible from the outside so that it may be seen at a glance if the seal has been tampered with.

The object of the improvement is to provide a closure especially adapted for housing a meter or the like upon the outside of a house or building in such position that the meter may be read without opening the closure, means being provided for automatically locking the lid or cover when the same is closed, a glass or similar readily breakable element being located over the locking device in such position that it is necessary to break the same in order to obtain access to the locking device.

The above and other objects may be attained by providing a box having a hinged or removable lid or cover, a locking device being located in one of said members for locking engagement with the other member when the lid or cover is closed, a panel of glass or similar readily breakable, transparent material having a distinctive marking, preferably upon its rear face, being located in such position that when the same is broken, access may be had to the locking device to release the same.

An embodiment of the invention is illustrated in the accompanying drawing, in which Figure 1 is a perspective view of a meter box embodying the invention;

Fig. 2, an enlarged transverse sectional view through the lower portion of the meter box showing the cover in locked position thereon;

Fig. 3, a similar view showing the readily breakable element destroyed and a screw driver or the like inserted to release the locking device;

Fig. 4, a view similar to Figs. 2 and 3 showing the cover in partly open position;

Fig. 5, a fragmentary plan section of the lower end of the box and cover showing the locking device in the locked position, taken substantially on the line 5—5, Fig. 2;

Fig. 6, a section on the line 6—6, Fig. 5, showing the readily breakable element which must be destroyed in order to obtain access to the locking device; and Fig. 7, a fragmentary sectional view through the hinge joint at the upper end of the box and cover.

Similar numerals refer to similar parts throughout the drawing.

The invention is illustrated as applied to a meter box especially adapted for use upon the outside of a building and arranged to house an electric meter in such position that the dials thereof may be read without opening the box. This meter box is preferably made of sheet metal and so constructed as to be waterproof and comprises the box proper indicated generally at 15 which may be provided with the upturned flange 16 at its upper end at the open side of the box, and the lid or cover 17 shaped to snugly fit over the open edge of the box and having at its upper end the depending flange 18 adapted to be lapped over the upturned flange 16 of the box to form an open hinged joint at the upper end of the box and cover.

The cover may be provided in its front face with an opening 19 covered by a panel 20 of glass or the like so positioned as to display the dials 21 of the meter 22 which is housed within the box so that these dials may be read without the necessity of removing the cover from the box.

Ordinarily boxes of this kind are provided with registering or interengaging ears or the like upon the box and lid to receive any usual and well known form of seal such as a lock, a wire with a slug of lead pressed upon the ends thereof or the like which may be placed thereon by an agent of the power company. Although such a seal may be placed upon the box forming the present invention, the construction is such that even though this seal is broken by an unauthorized person, access cannot in that way be had to the interior of the box.

The construction to which the invention is more particularly directed is a meter closure comprising a box and cover having a self-locking device contained within the box and cover and so constructed that when the cover is moved to closed position, it is automatically locked to the box and cannot be unlocked without breaking a glass or similar readily breakable element covering an aperture in the cover through which access may be had to the locking device to release the same.

Although various forms of locking devices may be used, this locking device may comprise a hook 23 which may be formed of spring material, the shank thereof being connected to the box preferably by a pivotal connection such as a rivet 24 or the like carried by a bracket 25 which may be welded or otherwise secured to the interior of the box and provided with a pair of lugs 26 arranged to hold the hook in position so that it will engage the locking bracket indicated generally at 27 carried by the cover. If for any reason it is desired to close the box without locking the same, the hook may be sprung over the lugs 26 and swung upon its pivot to the position shown in broken lines in Fig. 5. The hook 23 may be offset angularly as at 28 and then bent back upon itself as at 29 terminating in the outturned angular end 30.

The bracket 27 is welded or otherwise secured to the interior of the cover 17 and is provided with a tubular keeper portion 31 to receive the hook, the end of said tubular keeper portion toward the hook being flared as at 32 to permit the hook to easily enter the same. The opposite end of the tubular keeper portion may also be flared as at 33 for a purpose to be later explained. A slot 34 is formed in the tubular keeper portion to receive the angular end 29 of the hook as shown in Figs. 2 and 5.

If desired, an ear 35 may be fixed upon the lower end portion of the box portion 15 and an ear 36 may be hingedly or pivotally connected to the cover portion as at 37 and arranged to register with or be interlocked with the ear 35 when the cover is in closed position so that any usual and well known form of seal may, if desired, be applied to these ears as in usual practice.

When the cover is moved into closed position upon the box, the hook carried by the box will be received in the tubular keeper 31 of the cover and the angular end 29 of the hook will spring into the slot 34 in the keeper, locking the cover upon the box, as shown in Fig. 2. The cover cannot then be removed from the box until the hook is released from the keeper and access thereto can be had only through the opening 38 formed in the cover for this purpose and arranged to be normally closed by a readily breakable element such as the sheet of glass 39 which may have any suitable inscription or insignia of the power company thereon so that the same will not be easily replaceable.

As shown in Fig. 6, this insignia may be placed in reverse position upon the rear face of the glass, by any suitable well known means, as a decalcomania or the like, so as to be visible in properly readable position through the front face of the glass. This sheet of glass may be slidably located between the front wall of the cover and the guide plate 40 which may be welded or otherwise attached thereto, a screw 41 being provided for retaining the glass in position and preventing its removal without destroying the glass, a lock nut 42 being preferably provided upon said screw.

The guide plate 40 is cut away or provided with an opening 40a coextensive with the opening 38 in the front wall of the cover member so that when the glass 39 is broken access may be had to the locking means.

With the cover closed and locked as shown in Fig. 2, it is necessary to break the glass 39 and insert a screw driver or the like indicated at 43, through the opening 38 and through the flared end 33 of the tubular keeper 31, to disengage the angular end 29 of the hook from the slot 34, of the keeper, as shown in Fig. 3, when the cover may then be swung to open position.

From the above it will be seen that a locking device is provided which automatically locks the meter closure when the cover is closed upon the box, the cover being held in locked position until the glass element is destroyed and a screw driver or the like inserted through the opening thus provided, to release the locking device. As the readily breakable element is provided with any desired inscription or insignia of the power company, it will be seen that the same cannot be easily replaced so that any tampering with the meter closure by unauthorized persons will be quickly detected.

I claim:

1. A seal for a meter box having a displaceable cover member, comprising a sealing element formed of readily breakable material having insignia visible from the outside of the box and adapted to close an opening formed in a portion of said box through which access may be had to a securing member which fastens said cover member in the closed position, and means for fastening said sealing element in position covering said opening, said means comprising a guide plate spaced inwardly from the portion of the box in which said opening is formed and adapted to permit said sealing element to be inserted between one edge of the guide plate and the adjacent portion of the box, the guide plate being cut away coextensive with said opening, and means adjacent to said edge of the guide plate for preventing removal of the sealing element.

2. A seal for a meter box having a displaceable cover member, comprising a sealing element formed of readily breakable material having insignia visible from the outside of the box and adapted to close an opening formed in a portion of said box through which access may be had to a securing member which fastens said cover member in the closed position, and means for fastening said sealing element in position covering said opening, said means comprising a guide plate spaced inwardly from the portion of the box in which said opening is formed and connected at its side edges to the interior of the box and spaced at its upper edge from the box whereby said seal may be inserted between the upper edge of the guide plate and the adjacent portion of the box, there being an opening in said guide plate registering with the opening in the box, and means adjacent to the upper edge of the guide plate for preventing removal of the sealing element.

3. A seal for a meter box having a displaceable cover member, comprising a sealing element formed of readily breakable material having insignia visible from the outside of the box and adapted to close an opening formed in a portion of said box through which access may be had to a securing member which fastens said cover member in the closed position, and means for fastening said sealing element in position covering said opening, said means comprising a guide plate spaced inwardly from the portion of the box in which said opening is formed and connected at its side edges to the interior of the box and spaced at its upper edge from the box whereby said seal may be inserted between the upper edge of the guide plate and the adjacent portion of the box, there being an opening in said guide plate registering with the opening in the box and open through the lower edge of the guide plate, and means adjacent to the upper edge of the guide plate for preventing removal of the sealing element.

4. A seal for a meter box having a displaceable cover member, comprising a sealing element formed of readily breakable material having insignia visible from the outside of the box and adapted to close an opening formed in a portion of said box through which access may be had to a securing member which fastens said cover member in the closed position, and means for fastening said sealing element in position covering said opening, said means comprising a guide plate spaced inwardly from the portion of the box in which said opening is formed and adapted to permit said sealing element to be inserted between one edge of the guide plate and the adjacent portion of the box, the guide plate being cut away coextensive with said opening, and means accessible only from the interior of the box for preventing removal of the sealing element.

5. A seal for a meter box having a displaceable cover member, comprising a sealing element formed of readily breakable material having insignia visible from the outside of the box and adapted to close an opening formed in a portion of said box through which access may be had to a securing member which fastens said cover member in the closed position, and means for fastening said sealing element in position covering said opening, said means comprising a guide plate spaced inwardly from the portion of the box in which said opening is formed and connected at its side edges to the interior of the box and spaced at its upper edge from the box whereby said seal may be inserted between the upper edge of the guide plate and the adjacent portion of the box, there being an opening in said guide plate registering with the opening in the box, and means accessible only from the interior of the box for preventing removal of the sealing element.

6. A seal for a meter box having a displaceable cover member, comprising a sealing element formed of readily breakable material having insignia visible from the outside of the box and adapted to close an opening formed in a portion of said box through which access may be had to a securing member which fastens said cover member in the closed position, and means for fastening said sealing element in position covering said opening, said means comprising a guide plate spaced inwardly from the portion of the box in which said opening is formed and connected at its side edges to the interior of the box and spaced at its upper edge from the box whereby said seal may be inserted between the upper edge of the guide plate and the adjacent portion of the box, there being an opening in said guide plate registering with the opening in the box and open through the lower edge of the guide plate, and means accessible only from the interior of the box for preventing removal of the sealing element.

RICHARD W. GRACE.